United States Patent
Leube et al.

(10) Patent No.: US 11,892,366 B2
(45) Date of Patent: Feb. 6, 2024

(54) METHOD AND SYSTEM FOR DETERMINING AT LEAST ONE OPTICAL PARAMETER OF AN OPTICAL LENS

(71) Applicant: Carl Zeiss Vision International GmbH, Aalen (DE)

(72) Inventors: Alexander Leube, Aalen (DE); Eric Nehrbass, Aalen (DE); Siegfried Wahl, Donzdorf (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/192,324

(22) Filed: Mar. 29, 2023

(65) Prior Publication Data
US 2023/0243717 A1 Aug. 3, 2023

Related U.S. Application Data

(63) Continuation of application No. PCT/EP2021/076784, filed on Sep. 29, 2021.

(30) Foreign Application Priority Data

Sep. 30, 2020 (EP) .................................... 20199313

(51) Int. Cl.
G01M 11/02 (2006.01)
H04N 23/57 (2023.01)
(Continued)

(52) U.S. Cl.
CPC ... G01M 11/0235 (2013.01); B29D 11/00009 (2013.01); G01M 11/0207 (2013.01);
(Continued)

(58) Field of Classification Search
CPC ......... G01M 11/0235; G01M 11/0207; G01M 11/0257; G01M 11/081; G01M 11/0221;
(Continued)

(56) References Cited

U.S. PATENT DOCUMENTS 3,870,415 A * 3/1975 Cornsweet ......... G01M 11/0235
356/124
6,252,285 B1 6/2001 Furumiya et al.
(Continued)

FOREIGN PATENT DOCUMENTS

CN 103163663 A 6/2013
CN 107063646 A 8/2017
(Continued)

OTHER PUBLICATIONS

Thibos et al., "Power vectors: An Application of Fourier Analysis to the Description and Statistical Analysis of Refractive Error," Optometry and Vision Science, vol. 74, No. 6, pp. 367 to 375, 1997.
(Continued)

*Primary Examiner* — Roy M Punnoose
(74) *Attorney, Agent, or Firm* — Tautz & Schuhmacher LLC; Georg M. Hasselmann (57) ABSTRACT

A method, a computer program product, and a system for determining an optical parameter of an optical lens as well as a related method for producing the optical lens by adjusting the optical parameter are disclosed. The method includes: capturing an image picturing the optical lens by using a camera; and determining an optical parameter of the optical lens by processing the image, wherein the camera generates a signal related to a position of a focus, and the optical parameter of the optical lens is determined by using the signal related to the position of focus. The method and the system allow determining the optical parameter of the optical lens in a direct fashion by applying the signal related to the position of the focus as generated by the camera as a measured value for the optical parameter of the optical lens.

22 Claims, 2 Drawing Sheets

(51) Int. Cl.
    *B29D 11/00*     (2006.01)
    *G01M 11/08*     (2006.01)
    *G03B 13/36*     (2021.01)

(52) U.S. Cl.
    CPC ...... *G01M 11/0257* (2013.01); *G01M 11/081* (2013.01); *G03B 13/36* (2013.01); *H04N 23/57* (2023.01)

(58) Field of Classification Search
    CPC ......... G01M 11/0264; B29D 11/00009; G03B 13/36; H04N 23/57
    See application file for complete search history.

(56) References Cited

U.S. PATENT DOCUMENTS

| | | | |
|---|---|---|---|
| 10,379,387 B2* | 8/2019 | Schön | G02C 13/005 |
| 11,243,139 B2* | 2/2022 | Meschenmoser | G01M 11/0235 |
| 2001/0055111 A1* | 12/2001 | Yoda | G01M 11/0207 356/127 |
| 2007/0115353 A1* | 5/2007 | Divo | G02C 13/005 348/46 |
| 2013/0148111 A1* | 6/2013 | Hanssen | G01M 11/0278 356/124 |
| 2013/0155393 A1 | 6/2013 | Blonde et al. | |
| 2014/0009737 A1* | 1/2014 | Kweon | A61B 3/111 351/204 |
| 2015/0300912 A1* | 10/2015 | Allione | G01M 11/0285 356/124.5 |
| 2017/0336284 A1* | 11/2017 | Goldberg | G01M 11/0228 |
| 2018/0106700 A1 | 4/2018 | Limon et al. | |
| 2018/0224675 A1 | 8/2018 | Gueu et al. | |
| 2018/0239174 A1* | 8/2018 | Schön | A61B 3/04 |
| 2018/0306670 A1* | 10/2018 | Goldberg | G01M 11/0242 |
| 2019/0128825 A1 | 5/2019 | Zhong et al. | |
| 2020/0408635 A1 | 12/2020 | Gueu et al. | |

FOREIGN PATENT DOCUMENTS

| | | |
|---|---|---|
| CN | 110543032 A | 6/2019 |
| CN | 111279269 A | 6/2020 |
| CN | 111512217 A | 8/2020 |
| EP | 2608109 A1 | 6/2013 |
| EP | 3128362 A1 | 2/2017 |
| JP | H11307750 A | 11/1999 |
| WO | 2017125902 A1 | 7/2017 |
| WO | 2017134275 A1 | 8/2017 |
| WO | 2017138004 A1 | 8/2017 |
| WO | 2017201144 A1 | 11/2017 |
| WO | 2020216788 A1 | 10/2020 |

OTHER PUBLICATIONS

Industrial Norm "Ophthalmic optics—Spectacle lenses—Vocabulary (ISO 13666:2019)," English version EN ISO ISO 13666:2019, Dec. 2019.
European Search Report issued in EP 20 199 343.6, to which this application claims priority, dated Mar. 18, 2021.
International Search Report and Written Opinion issued in PCT/EP2021/076784, to which this application claims priority, dated Apr. 7, 2022.
International Preliminary Report on Patentability issued in PCT/EP2021/076784, to which this application claims priority, dated Jul. 18, 2022.
Office Action by the Chinese Patent Office issued in CN 202180067152. 1, which is a counterpart hereof, dated Nov. 24, 2023, and English-language translation thereof.

* cited by examiner

FIG. 5

METHOD AND SYSTEM FOR DETERMINING AT LEAST ONE OPTICAL PARAMETER OF AN OPTICAL LENS

CROSS REFERENCE TO RELATED APPLICATIONS

This application is a continuation application of international patent application PCT/EP2021/076784, filed on Sep. 29, 2021 and designating the U.S., which claims priority to European patent application EP 20 199 313.6, filed on Sep. 30, 2020, both of which are hereby incorporated by reference in their entireties.

TECHNICAL FIELD

The present disclosure relates to a method, a computer program product, and a system for determining at least one optical parameter of at least one optical lens, typically of at least one spectacle lens, and to a related method for producing at least one optical lens, typically at least one spectacle lens, by adjusting at least one optical parameter.

BACKGROUND

Various methods, computer program products, and systems for determining at least one optical parameter of at least one optical lens as well as related methods for producing at least one optical lens by adjusting at least one optical parameter are known.

Standard ISO 13666:2019, hereinafter also referred to as "Standard," defines terms relating to ophthalmic optics, in particular terms relating to blanks, finished lenses and their fitting. In particular, Section 3.1 relates to fundamentals of optics, Sections 3.2. to 3.8 refer to spectacle lenses, Section 3.9 relates to determining optical parameters of a spectacle lens, especially by using a focimeter, Sections 3.10-3.17 deal with optical parameters of spectacle lenses, and Section 3.18 refers to coatings for spectacle lenses.

EP 2 608 109 A1 discloses a method for estimating an optical power of corrective lenses in a pair of eyeglasses worn by a spectator, the method comprising the following steps:—
  acquire two consecutive images of this spectator's face located in front of a means for acquiring these two images, one of these images being acquired with eyeglasses and the other without;
  calibrate one of the two acquired images with respect to the other;
  identify the position of the iris of each eye in each image;
  evaluate the size magnification or size reduction of each imaged iris; and
  estimate the optical power of the corrective lenses based on the evaluated magnification or reduction.

WO 2017/125 902 A1 discloses devices, systems, and/or methods of determining one or more optical parameters of a lens of eyeglasses. For example, a product may include one or more tangible computer-readable non-transitory storage media including computer-executable instructions operable to, when executed by at least one computer processor, enable the at least one computer processor to process at least one captured image of at least one reflection of a flash on a lens of eyeglasses; and determine one or more optical parameters of the lens based at least on the at least one captured image.

WO 2017/134275 A1 discloses a method for determining an optical axis of a lens when the lens is provided at an unknown position and/or orientation. The method comprises:

a) obtaining at least one direct image of a background comprising identifiable features;
b) providing a lens between the background and a camera such that light rays pass from the background, through the lens before arriving at the camera;
c) using the camera to obtain at least one indirect image comprising the background when viewed through the lens;
d) identifying at least one identifiable feature in the direct image and a corresponding identifiable feature in the indirect image; and
e) using the correspondences from d) to determine an optical axis of the lens without aligning the optical axis of the lens with respect to the camera.

CN 107 063 646 A discloses a method and a device using a camera for determining the effective focal length of a lens, and a virtual reality (VR) headset. The method comprises: adjusting the position of the lens between the camera and a display screen to make the optical axis of a camera lens parallel to the normal of the display screen and the optical axis of the camera lens collinear with the optical axis of the lens, adjusting the distance between the lens and the display screen to arrange the lens at a theoretically designed position and fix the lens, and adjusting the camera lens to the exit pupil position of the lens; by controlling the camera with a camera controller to perform continuous scanning and photographing of virtual images of the display screen generated by the lens and to record the control focus value of the camera controller corresponding to each photograph, and obtaining the virtual image distance of the lens according to the control focal length value corresponding to the photograph with the highest definition; and obtaining the effective focal length of the lens through the functional relationship between the virtual image distance of the lens and the effective focal length of the lens and the virtual image distance.

EP 3 128 362 A1 discloses a method for determining a parameter of an optical equipment, the method comprising:—an optical equipment positioning step, during which an optical equipment comprising a pair of optical lenses mounted on a spectacle frame is positioned in a first position, —a portable electronic device positioning step, during which a portable electronic device comprising an image acquisition module is positioned in a second position determined and/or known relatively to the first position so as to acquire an image of a distant element seen through at least part of the optical lenses of the optical equipment in the first position, —a parameter determining step, during which at least one optical parameter of the optical equipment is determined based on the image of a distant element seen through at least part of the optical lenses of the optical equipment in the first position.

WO 2017/201144 A1 discloses a process for determining characteristics of a lens which includes capturing a first captured image of a pattern through a corrective lens while the corrective lens is at a first distance from the pattern; capturing a second captured image of the pattern through the corrective lens while the corrective lens is at a second distance from the pattern; processing the first captured image to determine a first spherical power measurement; processing the second captured image to determine a second spherical power measurement; selecting, from among a plurality of spherical power measurements comprising the first spherical power measurement and the second spherical power measurement, an extreme spherical power measurement among the plurality of spherical power measurements;

and determining, with reference to the extreme spherical power measurement, a lens power of the corrective lens.

WO 2020/216788 A1 discloses a method, a device, and a computer program for determining at least one optical parameter of a spectacle lens and a method for producing the spectacle lens using the at least one optical parameter, wherein the optical parameter designates a value for a property of the spectacle lens which is adjusted during producing the at least one spectacle lens configured to correct at least one refractive error of at least one eye of a user of the at least one spectacle lens. The method comprises the following steps: capturing an image using the spectacle lens; and determining at least one optical parameter of the spectacle lens by image processing of the image, wherein the image comprises an eye portion enclosing the eyes and/or a face portion of a user of the spectacle lens adjacent the eyes.

SUMMARY

It is an objective of the present disclosure to provide a method, a computer program product and a system for determining at least one optical parameter of at least one optical lens, typically of at least one spectacle lens, and to a related method for producing at least one optical lens, typically at least one spectacle lens, by adjusting at least one optical parameter, which at least partially overcome the above-mentioned problems of the prior art.

It is a particular objective of the present disclosure to be able to determine values for the at least one optical parameter by applying a simple and easy-to-use approach. Thereby, it would be desirable to be able to determine the desired values for the at least one optical parameter in a direct fashion without being required to use intermediate parameters, such one or more values for a magnification of an object within an image, or to apply sophisticated ray-tracing calculations.

This problem is solved by a method, a computer program product, and a system for determining at least one optical parameter of at least one optical lens, typically of at least one spectacle lens, as well as by a related method for producing at least one optical lens, typically at least one spectacle lens, by adjusting at least one parameter with the features of the independent claims. Typical exemplary embodiments, which might be implemented in an isolated fashion or in any arbitrary combination, are listed in the dependent claims.

As used in the following, the terms "have," "comprise" or "include" or any arbitrary grammatical variations thereof are used in a non-exclusive way. Thus, these terms may refer to both a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, as used in the following, the terms "typically," "more typically," "particularly," "more particularly," or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an exemplary embodiment of the disclosure" or similar expressions are intended to be optional features, without any restriction regarding alternative exemplary embodiments of the disclosure, without any restrictions regarding the scope of the disclosure and without any restriction regarding the possibility of combining the features introduced in this way with other features of the disclosure. Method or process steps do not necessarily have to be performed in the order they are listed in, but, when feasible, may also be performed simultaneously or in reversed order.

In a first aspect, the present disclosure relates to a method for determining at least one optical parameter of at least one optical lens, typically of at least one spectacle lens. As generally used, the term "optical lens" refers to at least one optical element which is configured to transmit an incident light beam in a fashion that the incident light beam is focused or dispersed by refraction as effected by the at least one optical element. Herein, the terms "refraction" or "refractive" refer to a bending of the incident light beam which is transmitted by the at least one optical element. Based on the Standard, Section 3.5.2, the terms "spectacle lens" or "ophthalmic lens" relate to a particular kind of optical lens which is used for determining and/or correcting a defective vision of a user, wherein the optical lens is carried in front of the eye of the user, whereby a direct contact with the eye is avoided. Instead of the term "user," a different term, such as "subject," "person," "test person" or "wearer of eye glasses," may also be applicable.

As further generally used, the term "optical parameter" relates to at least one property of the at least one optical lens, typically of the at least one spectacle lens, which is capable of altering the incident light beam through the at least one optical lens, typically the at least one spectacle lens. As indicated above, the Standard, particularly Sections 3.10-3.17, deals with optical parameters of spectacle lenses, in particular with regard to spherical, prismatic and astigmatic properties of different kinds of spectacle lenses. As further generally used, the term "determining" relates to a process of generating at least one representative result in form of at least one value, such as a numerical or an alphanumerical value, in particular by using the method according to the present disclosure. For this purpose, at least one evaluation unit which may be configured to determine at the least one optical parameter of the at least one optical lens, typically of the at least one spectacle lens, can be employed.

The method according to the present disclosure comprises the following steps a) and b) that may, typically, be performed in the indicated order starting with step a) and continuing with step b), wherein a partial overlap may also be feasible by starting with step b) prior to finishing the execution of step a):

a) capturing at least one image picturing the at least one optical lens, typically the at least one spectacle lens, by using at least one camera; and b) determining at least one optical parameter of the at least one optical lens, typically of the at least one spectacle lens, by processing the at least one image, wherein the at least one camera generates at least one signal related to a position of a focus, and the at least one optical parameter of the at least one optical lens, typically of the at least one spectacle lens, is determined by using the at least one signal related to the position of the focus.

The present method for determining at least one optical parameter of an optical lens can, in particular, be used for determining at least one optical parameter of a spectacle lens which can be considered, as indicated above, as a particular kind of optical lens. Herein, the at least one optical parameter can be used for selecting and/or producing a further pair of spectacle lenses to be used, for example, as a second pair of spectacle lenses or for replacement. Further, the at least one optical parameter can be used as a starting parameter for a following objective or subjective determination of the refractive errors of the eye of the user.

The at least one optical parameter as determined with the present method can, in particular, be used for determining a spherocylindrical lens which may be employed as a spectacle lens in order to compensate at least one refractive error of at least one eye of a user by applying a correction in a fashion that a, typically, optimal image quality can be achieved for the user. In this context, the term "optical parameter" refers to a value for a property of the spectacle lens which can be adjusted, in particular during the production of the spectacle lens from the lens blank, typically, to achieve the desired correction. For describing the spherocylindrical lens, various approaches are possible. As defined in the Standard, Section 3.6.6, the term "spherocylindrical lens" refers to a spectacle lens having a spherical surface and a cylindrical surface. Further, the spherocylindrical lens is defined, according to Section 3.13.1, as a spectacle lens which combines a paraxial, parallel beam of light in two individual, mutually perpendicular focal lines, whereby the spectacle lens has an apex refractive power only in the two main sections. Further, the term "apex refractive power" is, according to Section 3.10.7, defined as a reciprocal value of the width of the paraxial section. As further defined in Section 3.13.2, the term "main section" relates to one of two perpendicular meridians of the spectacle lens having an astigmatic effect being parallel to the two focal lines. Herein, the term "astigmatic effect" corresponds to an "astigmatic difference" which is defined in Section 3.13.6 as a difference between the value of the apex refractive power in the second main section and the value of the apex refractive power in the first main section. Further, the "cylindrical power" refers, according to Section 3.13.7, to an algebraic difference between the refractive values of the main sections, wherein the refractive value of a particular main section being used as a reference is subtracted from the refractive value of the other main section, while the "cylinder axis" indicates according to Section 3.13.8 the direction of the main section of the spectacle lens whose apex refractive index is used as the reference.

As an alternative, L. N. Thibos, W. Wheeler and D. Horner (1997), Power Vectors: An Application of Fourier Analysis to the Description and Statistical Analysis of Refractive Error, Optometry and Vision Science 74 (6), S. 367-375, propose to approach the description of a spherocylindrical lens from a viewpoint of Fourier analysis of a power profile. They show that the familiar sine-squared law leads naturally to a Fourier series representation with exactly three Fourier coefficients, representing natural parameters of a thin lens. Herein, a constant term corresponds to a mean spherical equivalent (MSE) power, whereas amplitude and phase of the harmonic correspond to the power and axis of a Jackson cross-cylinder (JCC) lens, respectively. Expressing the Fourier series in rectangular form leads to the representation of an arbitrary spherocylindrical lens as sum of a spherical lens and two cross-cylinders, one at axis 0° and the other at axis 45°. The power of these three component lenses may be interpreted as (x, y, z) coordinates of a vector representation of the power profile. The power vector representation of a spherocylindrical lens can be used for numerical and graphical analysis of optometric data for problems involving lens combinations, comparison of different lenses, and statistical distribution of refractive errors.

According to step a), at least one image which pictures the at least one optical lens is captured by using at least one camera. As used herein, the term "image" refers to a two-dimensional representation or a three-dimensional representation of the at least one optical lens, typically of the at least one spectacle lens, wherein the term "representation" refers to a set of data being captured by using at least one optical recording unit, hereinafter referred to as a "camera." As further used herein, the term "capturing" relates to recording a single image or several images, in particular in form of at least one video sequence. As further used herein, the term "picturing" or grammatical variations thereof describes that the at least one image comprises a picture of the at least one optical lens, typically of the at least one spectacle lens. In particular, the at least one image may be recorded by the at least one camera in a fashion that the at least one optical lens, typically the at least one spectacle lens, is arranged between the at least one camera and at least one object, wherein the at least one object is located in space in at least one first distance to the at least one optical lens, typically the at least one spectacle lens, and in at least one second distance to the at least one camera, in particular, in a manner that a path of a light beam impinging on the at least one camera, also referred to as "beam path," may be guided through the at last one optical lens, typically the at least one spectacle lens. Herein, at least one first distance may, generally, differ from the at least one second distance. Typically, the at least an object can be at least one pattern as described below in more detail, wherein further kinds of objects may also be feasible.

As already indicated above, the at least one camera may serve as an optical recording unit for capturing the at least one image which comprises at least one picture of the at least one optical lens, typically of the at least one spectacle lens. In a particularly typical exemplary embodiment, the at least one camera may be comprised by a mobile communication device. As used herein, the term "mobile communication device" refers to at least one of a smartphone, a tablet, or a personal digital assistant, which can be carried by the user and, thus, move together with the user. However, other types of mobile communication devices are conceivable. In particular, the at least one camera may be at least one of a rear camera or a front camera as comprised by the mobile communication device. In this fashion, the desired image may be captured advantageously by using the at least one camera at any desired location. However, other types of cameras may also be possible.

According to step b), at least one optical parameter of the at least one optical lens, typically of the at least one spectacle lens, is determined by processing the at least one image which has been captured during step a). With respect to the term "determining" or grammatical variation thereof, reference can be made to the definition above. As used herein, the term "processing" refers to applying at least one algorithm in order to extract at least one piece of picture information from at least one image. In particular, the at least one algorithm may be configured to determine the at least one optical parameter by evaluating the two-dimensional representation or the three-dimensional representation of the at least one image according to a scheme. Herein, the evaluation may be performed in accordance with a predefined scheme, however, artificial intelligence, in particular machine learning, may also be applied, especially by using a neuronal network. As generally used, the term "machine learning" refers to a process applying artificial intelligence to automatically generate a model for classification or regression. A machine learning algorithm configured to generate the desired model based on a large number of training data sets can, typically, be used. Herein, the machine learning algorithm can be a supervised algorithm or a self-learning algorithm. The machine learning algorithm can use and/or comprise a neural network, which may, typically, be developed into a trained neural network by using the at least one training data set. The neural network may comprise at least one element selected from hierarchical decision trees, Hough forest, regression forest, Convolutional Neural Network (CNN), Deep Neural Network (DNN) Residual Neural Network, Pixel-wise Voting, Pixel-wise Fusion Network, Deep learning. Alternatively or additionally, the use of at least one other artificial intelligence method, typically a kernel method, especially a Support Vector Machine (SVM), may also be possible. From the at least one image captured by the at least one camera, the desired at least one optical parameter of the optical lens, typically of the at least one spectacle lens, can be determined by image processing, typically by using at least one evaluation unit being configured for this purpose.

As used according to the present disclosure, the at least one camera generates at least one signal which is related to a position of a focus. As generally used, the term "focus" relates to at least one point in which parallel light beams which impinge on a convergent optical lens, typically the at least one spectacle lens, meet. In particular, the signal as generated by the at least one camera which is related to the position of the focus may correspond to at least one of a sharpness or a maximum of a contrast of the at least one image. As further used herein, the term "position" refers to a location of the at least one focus in space. As a result, a "focal length" can, generally, be assigned to a distance between the position of the at least one focus and a principal plane of the convergent optical lens, typically of the at least one spectacle lens. Strictly speaking, the focus may not be limited to a single point in space but may, typically, assume a small volume having a non-vanishing spatial extent. However, such an observation does not affect the present disclosure since the at least one camera still generates the at least one signal that is related to the position of the focus, irrespective of a spatial extent thereof.

As already described above, at least one camera is used according to step a) to capture the at least one image which pictures the at least one optical lens, typically the at least one spectacle lens. In order to capture the at least one image, a location of the principal plane of at least one optical lens, typically of the at least one spectacle lens, within the at least one camera may, typically, be adjusted. Apart from cameras having a fixed-focus lens, the at least one camera may, for a purpose of adjusting the at least one optical lens, typically the at least one spectacle lens, within the at least one camera, comprise at least one mechanism which can be configured to adjust a position of the principal plane of the at least one optical lens, typically of the at least one spectacle lens, within the at least one camera. For this purpose, a position of the principal plane of the at least one optical lens, typically of the at least one spectacle lens, within the at least one camera may be moved and/or rotated. Alternatively or in addition, an optical power of the at least one lens, typically of the at least one spectacle lens, within the at least one camera can be altered. As a further alternative or in addition, at least two optical lenses, typically at least two spectacle lenses, may be used within the at least one camera, wherein a relative position of the at least two optical lenses, typically the at least two spectacle lenses, can be altered. However, further alternatives may also be conceivable.

As further used herein, the term "signal" relates to at least one digital value which is provided by the at least one camera, wherein the at least one digital value is assigned, in a direct or an indirect fashion, to the position of the principal plane of the at least one optical lens, typically of the at least one spectacle lens, within the at least one camera. By way of example, the at least one digital value may be generated by recording at least one physical value related to at least one of a movement or a rotation of the position of the principal plane of the at least one optical lens, typically of the at least one spectacle lens, within the at least one camera, wherein the at least one physical value may be processed into a modified value that can be expressed as a derived value, such as fraction or a percentage, of the at least one physical value with respect to a default value. For the purposes of the present disclosure, it is sufficient if the at least one signal is related to the position of the focus in a fashion that different positions of the focus generate different signals that can be distinguished from each other. As described below in more detail, the at least one signal related to the position of the focus can, in particular, serve as an input for at least one calibration function to be used in determining the at least one optical parameter of the at least one optical lens, typically of the at least one spectacle lens.

Further, in order to capture the at least one image, the position of the focus of the at least one camera may, typically, be adjusted in at least one of a manual fashion by a user of the at least one camera or in an automatic manner by using at least one of an autofocus system or an autofocus function as comprised by the at least one camera. For this purpose, at least one of a sharpness or a maximum of a contrast of the at least one image may be adjusted in order to generate the desired the signal which is related to the position of the focus. According to the manual fashion, the user of the at least one camera can modify the position of the principal plane of the at least one optical lens, typically of the at least one spectacle lens, within the at least one camera, whereby the at least one camera generates the desired signal that is related to the actual position set by the user. For this purpose, the at least one camera can comprise at least one dial, which may be provided in at least one of a mechanical manner or a digital fashion, which may be configured to support the user when setting the position of the focus of the at least one camera. According to the automatic manner, the at least one of the autofocus system or the autofocus function as comprised by the at least one camera can modify the position of the principal plane of the at least one optical lens, typically of the at least one spectacle lens, within the at least one camera, whereby the at least one camera may generate the desired signal that is related to the actual position as set by the at least one of the autofocus system or the autofocus function. In a particular exemplary embodiment, the at least one camera may be configured to perform a scanning with regard to determining the position of the focus. In this particular exemplary embodiment, a course of the at least one optical parameter of the at least one optical lens, typically of the at least one spectacle lens, can be determined, whereby a movement of at last one of the at least one camera and the at least one optical lens, typically the at least one spectacle lens, can be dispensable.

Independently of a manner in which the position of the focus of the at least one camera may be adjusted, the at least one signal which is related to the position of the focus and which is generated by the at least one camera is, in further accordance with the present disclosure, used for determining the at least one optical parameter of the at least one optical lens, typically of the at least one spectacle lens, of which at least one image has been captured by using the at least one camera. In other words, the position of the focus as adjusted by the at least one camera and the at least one corresponding signal as generated by the at least one camera varies depending on the at least one optical parameter of the at least one optical lens, typically of the at least one spectacle lens, of which the at least one camera has captured the at least one image. For definitions of the terms "optical lens" and "optical parameter" reference can be made to the description as provided above.

In a particularly typical exemplary embodiment, the at least one optical parameter of the at least one optical lens, typically of the at least one spectacle lens, may be determined by comparing the at least one signal as generated by the at least one camera which is related to the position of the focus to at least one further signal which is related to a further position of the focus in at least one further image as captured by the at least one camera, wherein the at least one further image is not picturing the at least one optical lens, typically the at least one spectacle lens. For this purpose, at least one first image may, typically, be captured by the at least one camera, wherein at least one first image may picture at least one scene, wherein the at least one scene may comprise the at least one object, in particular the at least one pattern, in front of which the at least one optical lens, typically the at least one spectacle lens, under investigation may be placed. Herein, the focus of the at least one camera can, typically, be adjusted in a fashion that the at least one object is located in the focus of the at least one optical lens, typically of the at least one spectacle lens, as comprised by the at least one camera. As a result, the at least one camera may generate at least one first signal which is related to the position of the focus when capturing the at least one first image.

Further, at least one further image may be captured by the at least one camera, wherein at least one further image may picture the same at least one scene, wherein the at least one scene may comprise the same at least one object, in particular the same at least one pattern, however, without the at least one optical lens, typically the at least one spectacle lens, under investigation placed in front thereof. Herein, the focus of the at least one camera may, again, be adjusted in a fashion that the at least one object is located in the focus of the at least one optical lens, typically of the at least one spectacle lens, comprised by the at least one camera. As a result, the at least one camera may generate at least one further signal which is now related to the position of the focus when capturing the at least one further image. As an alternative or in addition, an already existing comparison image for which at least one of the at least one further signal or the position of a focus is already known can also be used as the at least one further image. It is emphasized here, that the terms "first" and "further" with respect to the at least one image are not intended to define an order in which the images may be captured. In order words, a first image may be captured before or after a further image.

Apart from a trivial case in which the at least one optical lens, typically the at least one spectacle lens, under investigation may be a positive powered optical lens, typically spectacle lens, the at least one further signal as generated by the at least one camera when capturing the at least one further image differs from the at least one first signal as generated by the at least one camera when capturing the at least one first image. As a result, a relationship between the at least one first signal and the at least one further signal can be derived for being used in determining the at least one optical parameter of the at least one optical lens, typically of the at least one spectacle lens. Herein, the relationship may be or comprise at least one of a difference or a ratio between the at least one first signal and the at least one further signal; however, a further kind of relationship may also be conceivable. At least one of the at least one first signal, the at least one further signal, or the relationship between the at least one first signal and the at least one further signal can be presented to the user on a display, in particular, on a display as comprised by the at least one camera or on a separate display as controlled by the evaluation unit. Alternatively or in addition, the at least one of the at least one first signal, the at least one further signal, or the relationship between the at least one first signal and the at least one further signal can be used as an input for at least one further algorithm that may run on the at least one camera, the evaluation unit and/or a separate device.

In a particularly typical exemplary embodiment, at least one calibration function may be used in determining the at least one optical parameter of the at least one optical lens, typically of the at least one spectacle lens. For this purpose, at least one signal related to the position of the focus or at least one relationship between at least two different signals may serve as an input for the at least one calibration function. Typically, at least one known camera may be used for capturing a plurality of first images, wherein each first image may picture the same at least one scene comprising the same at least one object in front of which a plurality of optical lenses, typically of spectacle lenses, each having at least one known optical parameter may, typically in a consecutive manner, be placed. For the capturing of each first image, the at least one signal related to at least one position of the focus of the at least one camera can be adjusted in a fashion that the at least one object is located in the focus of the at least one camera. As a result, the at least one camera may generate, for each first image, at least one first signal that is related to the position of the focus when capturing the at least one first image. Further, at least one further signal related to the position of the focus when capturing the at least one further image picturing the same at least one scene comprising the same at least one object, however, without the at least one optical lens, typically the at least one spectacle lens, under investigation placed in front thereof can be generated by the at last one camera.

In this fashion, a dependency between a difference of the at least one first signal as generated by the at least one camera and the at least one optical parameter of the plurality of the optical lenses can be determined, wherein this dependency can be used as the at least one calibration function. After having determined the at least one calibration function, the at least one optical parameter of the at least one optical lens, typically the at least one spectacle lens, under investigation may be determined by using both the at least one first signal as generated by the at least one camera from the at least one first image picturing the at least one optical lens, typically the at least one spectacle lens, under investigation placed in front of the at least one object and the at least one further signal as generated by the at least one camera from the at least one further image being devoid of any one optical lens, typically of any one spectacle lens, in front of the at least one object.

As already indicated above, the at least one focus of the at least one camera may, typically, be adjusted at at least one object in space located in the at least one first distance to the at least one optical lens, typically to the at least one spectacle lens, and in the at least one second distance to the at least one camera, wherein the at least one optical parameter of at least one optical lens, typically of the at least one spectacle lens, can, typically, be determined by processing the at least one image which captures the at least one object in space in at least one first distance to the at least one optical lens, typically to the at least one spectacle lens, and in the at least one second distance to the at least one camera. Herein, the at least one object in space in the at least one first distance to the at least one optical lens, typically to the at least one spectacle lens, and in the at least one second distance to the at least one camera can be any arbitrary object being configured for this purpose, and can be resolved by the at least one camera. The at least one object in space in the at least one first distance to the at least one optical lens, typically to the at least one spectacle lens, and in the in at least one second distance to the at least one camera can be further at least one object, wherein the at least one optical parameter of at least one optical lens, typically of the at least one spectacle lens, can, typically, be determined by processing the at least one image which captures the at least one object. Herein, the at least one object can be any arbitrary spatially extended object which may serve as a resolution target, especially as known by the skilled person. In particular, the at least one object may be a pattern, in particular a predefined pattern selected from at least one of an oriented line, a circle, a letter, a number. In a particularly typical exemplary embodiment, specifically in a case which the at least one optical lens may be or comprise at least one spectacle lens, the at least one object may be or comprise at least one eye of the user. However, a further kind of object may also be feasible.

In a typical exemplary embodiment, the at least one optical parameter of the at least one optical lens, typically of the at least one spectacle lens, may be determined by using the at least one image capturing the at least one object and using therefrom at least one of:

spatial information which may be comprised by the at least one image that is captured by the at least one camera, wherein the spatial information may refer to at least one two- or three-dimensional value being related to at least one point in the at least one image;
  picture information which is captured by at least two color channels as comprised by the at least one camera, wherein a content of the picture information may differ between the at least two color channels of the at least one camera; and/or
  information about at least one temporal variation
    which may be synchronized between a screen that may be displaying the at least one object and the at least one camera, wherein a synchronization signal may be exchanged between the screen and the at least one camera; or
    wherein the at least one object which is displayed during step a) may be determined by analyzing the at last one image as, concurrently, captured during step a), wherein a particular image processing algorithm configured to perform this purpose may be used.

By using at least one approach in which the at least one optical parameter of the at least one optical lens, typically of the at least one spectacle lens, can, in particular, be determined from the at least one object by using at least one additional piece of information acquired from at least one of:

at least one known geometric dimension of the at least one object of at least one optical lens, typically of the at least one spectacle lens, having at least one known optical parameter, wherein at least one observed geometric dimension of the at least one object can, typically, be related to the at least one optical parameter of the at least one optical lens, typically of the at least one spectacle lens, by applying a known relationship;
  at least one known geometric distortion in the at least one image by using the at least one camera, wherein at least one observed geometric distortion in the at least one image can, typically, be related to the at least one optical parameter of the at least one optical lens, typically of the at least one spectacle lens, by applying a known relationship;
  at least one marking which may be comprised by the at least one optical lens, typically the at least one spectacle lens, wherein at least one alteration of at least one marking in the at least one image can, typically, be related to the at least one optical parameter of the at least one optical lens, typically of the at least one spectacle lens, by applying a known relationship.

However, further approaches may also be conceivable. As a particular advantage of using the at least one additional piece of information acquired from the at least one object, a single image picturing the at least one optical lens, typically the at least one spectacle lens, as captured by using the at least one camera can, thus, be sufficient to determine an absolute value of the at least one optical parameter of the at least one optical lens, typically of the at least one spectacle lens. However, as an alternative, at least two individual images as captured by using the at least one camera, each of which pictures the at least one optical lens, typically the at least one spectacle lens, under at least two different measurement parameters can be used for this purpose. Herein, the at least two different measurement parameters can differ with respect to each other by at least one of a position or an orientation of at last one of the at least one optical lens, typically of at least one of the at least one spectacle lens, or the at least one camera.

In a particular exemplary embodiment, at least one further algorithm for determining at least one object in the at least one image picturing the at least one optical lens, typically the at least one spectacle lens, can, typically, be applied. In particular, a detection of at last one of a spectacles frame carrying the at least one optical lens, typically the at least one spectacle lens, such as by employing a known algorithm dedicated to computer vision, or of at least one marking as comprised by the at least one optical lens, typically by the at least one spectacle lens, can be performed, specifically with respect to an optical axis of the at least one camera. Alternatively of in addition, an alteration of the at least one optical parameter over an extension of the at least one optical lens, typically of the at least one spectacle lens, such as in a progressive-power lens, may be determined, specifically with respect to an optical axis of the at least one camera, by using a tracking algorithm, wherein the at least one optical parameter of the at least one optical lens, typically of the at least one spectacle lens, can repeatedly be determined by acquiring the at least one signal as generated by the at least one camera which is related to the position of the focus as a function of a position within the at least one optical lens, typically the at least one spectacle lens. Alternatively or in addition, the repeated determining of the at least one optical parameter of the at least one optical lens, typically of the at least one spectacle lens, may be used for increasing an accuracy and/or a precision of the determination.

In a particular exemplary embodiment, the method according to the present disclosure may be a computer-implemented method. As generally used, the term "computer-implemented method" refers to a method which involves a programmable apparatus, in particular an evaluation unit, specifically a computer, a computer network, a computer readable medium carrying a computer program, or a mobile communication device, specifically a smartphone, a tablet, or a digital assistant, whereby at least one of the steps of the method is performed by using at least one computer program. However, a further kind of programmable apparatus may also be conceivable. Herein, the computer program code may be provided on a data storage medium or a separate device such as an optical storage medium, e.g. on a compact disc, directly on a computer or a data processing unit, in particular a mobile communication device, or via a network, such as an in-house network or the internet. The present method can, thus, be performed on a programmable apparatus which is configured for this purpose, such as by providing a particular computer program.

In a further aspect, the present disclosure refers to a computer program product which comprises instructions which, when the program is executed by a computer, cause the computer to carry out the method for determining at least one optical parameter of at least one optical lens, typically of at least one spectacle lens, according to the present disclosure. For this purpose, a computer program may comprise instructions which can be provided by means of a computer program code which are capable of performing any or all of the steps of the methods as described elsewhere herein and, thus, to establish determining the refractive error of the at least one eye of a user when implemented on a computer or a data processing unit. The computer program code may be provided on a data storage medium or a separate device such as an optical storage medium, e.g. on a compact disc, directly on a computer or a data processing unit, in particular a mobile communication device, specifically a smartphone, a tablet, or a digital assistant, or via a network, such as an in-house network or the internet.

In a further aspect, the present disclosure relates to a method for producing at least one optical lens, typically at least one spectacle lens. As generally, the producing of the at least one optical lens, typically the at least one spectacle lens, comprises processing at least one lens blank by adjusting at least one optical parameter of the at least one optical lens, typically of the at least one spectacle lens, as described in the prior art. According to the present disclosure, the at least one optical parameter of the at least one optical lens, typically of the at least one spectacle lens, is determined by using the method for determining at least one optical parameter of at least one optical lens, typically of the at least one spectacle lens, as described elsewhere herein.

For further details concerning the computer program product or the method for producing at least one optical lens, typically at least one spectacle lens, reference may be made to the method for determining at least one optical parameter of at least one optical lens, typically of at least one spectacle lens, according to the present disclosure as disclosed elsewhere herein.

In a further aspect, the present disclosure relates to a system for system for determining at least one optical parameter of at least one optical lens, typically of at least one spectacle lens. As generally used, the term "system" refers to a combination of at least two devices each of which is configured to perform a particular task, wherein, however, the at least two devices cooperate and/or interact with each other in order to achieve the desired task, which is here the determining of the at least one optical parameter of the at least one optical lens, typically of the at least one spectacle lens.

According to the present disclosure, the system comprises at least:
at least one camera, wherein the at least one camera is configured to capture at least one image picturing the at least one optical lens, typically the at least one spectacle lens;
at least one evaluation unit, wherein the at least one evaluation unit is configured to determine at least one optical parameter of the at least one optical lens, typically of the at least one spectacle lens, by processing the at least one image, wherein the at least one camera is further configured to generate at least one signal related to a position of a focus, and that the at least one evaluation unit is configured to determine the at least one optical parameter of the at least one optical lens, typically of the at least one spectacle lens, by using the at least one signal related to the position of the focus.

In a typical exemplary embodiment, the system may further comprise at least one of:
a screen configured to display at least one object; and/or
a distance meter configured to determine at least one distance, in particular at least one first distance between the at least one optical lens and the at least one object, and at least one second distance between the at least one camera and the at least one optical lens, typically the at least one spectacle lens; and/or
an imaging unit configured to detect at least one marking comprised by the at least one optical lens, typically by the at least one spectacle lens, and/or at least one spectacles frame carrying the at least one optical lens, typically the at least one spectacle lens; and/or
a holding unit configured to hold at least one of the at least one camera or the at least one optical lens, typically the at least one spectacle lens, specifically to contribute to increasing an accuracy and/or a precision of the determination of the at least one optical parameter of the at least one optical lens, typically of the at least one spectacle lens.

In a particularly typical exemplary embodiment, at least one, typically both, of the at least one camera or the at least one evaluation unit may be comprised by a mobile communication device, specifically a smartphone, a tablet, or a digital assistant. However, a further kind of mobile communication device may also be conceivable. As further generally used, the term "mobile communication device" refers to a mobile communication device which comprises a mobile operating system being designated for facilitating a use of software, internet, and multimedia functionalities. In particular, the mobile communication device may comprise at least one camera and at least one sensor, in particular, selected from a gyroscope, an accelerometer, a proximity sensor, a magnetometer, or a barometer, and may support wireless communications protocols such as Wi-Fi or Bluetooth.

In particular, the at least one camera may be configured to adjust the position of the focus by using at least one of
an autofocus system or an autofocus function as comprised by the at least one camera, or
an input generated by the user.

Further, the at least one camera configured to capture the at least one image may, specifically, be selected from a rear camera or a front camera, as comprised by the mobile communication device, or both. In particular, by using the rear camera, especially in addition with at least one mirror, the rear camera can be used for generating the at least one signal related to the position of the focus, typically by employing at least one of the autofocus system or the autofocus function as comprised by the at least one camera. Herein, in at least one first image, the focus can be adjusted to at least one eye of the user which functions as the object as described elsewhere herein in more detail, wherein the user is wearing the at least one spectacle lens, whereby at least one first signal can be generated by the at least one camera, and wherein, in at least one further image, the focus can be further adjusted to at least one eye of the user, wherein the user is not wearing the at least one spectacle lens, whereby at least one further signal can be generated by the at least one camera. As described elsewhere herein in more detail, the at last one optical parameter of the at least one optical lens, typically of the at least one spectacle lens, can, thus, be determined by applying a relationship between the at least one first signal and the at least one further signal, especially by using at least one calibration function.

Further, the at least one camera and the at least one evaluation unit of the mobile communication device can, jointly, be employed as the distance meter by being configured to determine the at least one first distance between the at least one optical lens, typically the at least one spectacle lens, and the at least one object, and at least one second distance between the camera and the at least one optical lens, typically the at least one spectacle lens.

Alternatively or in addition, further exemplary embodiments with respect to the device according to the present disclosure are conceivable.

For further details concerning the device for determining a refractive error of at least one eye of a user, reference may be made to the method device for determining a refractive error of at least one eye of a user as disclosed elsewhere herein.

As a particular advantage of the present disclosure, the methods, the computer program product and the device as disclosed herein allow determining the at least one optical parameter of the at least one optical lens, typically of the at least one spectacle lens, in a direct fashion by applying the at least one signal related to the position of the focus as generated by the at least one camera as a measured value for the at least one optical parameter of the at least one optical lens, typically of the at least one spectacle lens. This particular advantage distinguished the present disclosure from a prior art determination of at least one optical parameter of at least one optical lens, typically of the at least one spectacle lens, for which purpose at least one intermediate parameter, such one or more values for a magnification of an object by using the at least one optical lens, typically the at least one spectacle lens, or sophisticated ray-tracing calculations are, typically, used. Consequently, the present methods, the computer program product and the device allow an easy, direct and fast determination of the at least one optical parameter of the at least one optical lens, typically of the at least one spectacle lens, under investigation compared to state of the art methods, computer program products and devices, in particular, since a lower number of measurements and less evaluations have to be performed. In particular, a use of analytic models for determining the at least one optical parameter of the at least one optical lens, typically of the at least one spectacle lens, can be dispensable. Moreover, the opportunity to perform fast measurements allows a more precise determination of the at least one optical parameter of the at least one optical lens, typically of the at least one spectacle lens, especially, since undesired alterations of at least one measurement parameter, such as with respect to a position and/or an orientation of the at least one optical lens, typically of the at least one spectacle lens, and/or the at least one camera, can be avoided in an easier fashion.

Summarizing, the exemplary embodiments according to the following Clauses are particularly typical within the scope of the present disclosure, alone or in any combination:

Clause 1: A method for determining at least one optical parameter of at least one optical lens, the method comprising the following steps:
  a) capturing at least one image picturing the at least one optical lens by using a camera; and
  b) determining at least one optical parameter of the at least one optical lens by processing the at least one image, wherein the camera generates at least one signal related to a position of a focus, and the at least one optical parameter of the at least one optical lens is determined by using the at least one signal related to the position of the focus.

Clause 2: The method according to the preceding Clause, wherein the position of the focus is adjusted by at least one of the camera or a user.

Clause 3: The method according to any one of the preceding Clauses, wherein the at least one signal related to the position of the focus serves as an input for at least one calibration function which is used in determining the at least one optical parameter of the at least one optical lens.

Clause 4: The method according to any one of the preceding Clauses, wherein the at least one optical parameter of the at least one optical lens is determined by comparing the at least one signal related to the position of the focus to at least one further signal related to a further position of the focus in at least one further image not picturing the at least one optical lens.

Clause 5: The method according to the preceding Clause, wherein the at least one further image is captured by further using the camera, or wherein the at least one further image is a comparison image.

Clause 6: The method according to any one of the preceding Clauses, wherein the at least one focus of the camera is adjusted to at least one object in space in at least one first distance to the at least one optical lens and in at least one second distance to the at least one camera, wherein the at least one optical parameter of at least one optical lens is determined by processing the at least one image further capturing the at least one object in space in the at least one first distance to the at least one optical lens and in the at least one second distance to the at least one camera.

Clause 7: The method according to the preceding Clause, wherein the at least one object is or comprises at least one eye of the user.

Clause 8: The method according to any one of the two preceding Clauses, wherein the at least one optical parameter of the at least one optical lens is determined by using at least one from the at least one image capturing the at least one object:—
  spatial information comprised by the at least one image which is captured by the at least one camera;
  picture information which is captured by at least two color channels of the camera;
  information about at least one temporal variation which is synchronized between a screen displaying the at least one object and the camera, or wherein the at least one object displayed during step a) is determined by analyzing the at last one captured image.

Clause 9: The method according to any one of the three preceding Clauses, wherein the at least one optical parameter of the at least one optical lens is determined by using at least one of:

at least one known geometric dimension of the at least one object;
at least one known geometric distortion in the at least one image by using the camera;
at least one marking comprised by the at least one optical lens.

Clause 10: A computer program product comprising instructions which, when the program is executed by a computer, cause the computer to carry out the method for determining at least one optical parameter of at least one optical lens according to any one of the preceding Clauses.

Clause 11: A method for producing at least one optical lens, wherein the producing of the at least one optical lens comprises processing at least one lens blank by adjusting at least one optical parameter of the at least one optical lens, wherein the at least one optical parameter of the at least one optical lens is determined by a method for determining at least one optical parameter of at least one optical lens according to any one of the preceding method Clauses.

Clause 12: A system for determining at least one optical parameter of at least one optical lens, the system comprising:
at least one camera, wherein the at least one camera is configured to capture at least one image picturing the at least one optical lens;
at least one evaluation unit, wherein the at least one evaluation unit is configured to determine at least one optical parameter of the at least one optical lens by processing the at least one image,
wherein the at least one camera is further configured to generate at least one signal related to a position of a focus, and that the at least one evaluation unit is further configured to determine the at least one optical parameter of the at least one optical lens by using the at least one signal related to the position of the focus.

Clause 13: The system according to the preceding Clause, wherein the at least one camera is configured to adjust the position of the focus by using at least one of an autofocus system or an autofocus function as comprised by the camera, or an input generated by the user.

Clause 14: The system according to any one of the preceding system Clauses, further comprising at least one of:
a screen configured to display at least one object;
a distance meter configured to determine at least one distance;
an imaging unit configured to detect at least one marking comprised by the at least one optical lens;
a holding unit configured to hold at least one of the camera or the at least one optical lens.

Clause 15: The system according to any one of the preceding system Clauses, wherein at least one of the at least one camera or the at least one evaluation unit is comprised by a mobile communication device, wherein the at least one camera configured to capture the at least one image is at least one of a rear camera or a front camera as comprised by the mobile communication device.

Further optional features and exemplary embodiments of the present disclosure are disclosed in more detail in the subsequent description of typical exemplary embodiments, typically in conjunction with the dependent claims. Therein, the respective optional features may be realized in an isolated fashion as well as in any arbitrary feasible combination, as the skilled person will realize. It is emphasized here that the scope of the disclosure is not restricted by the typical exemplary embodiments

BRIEF DESCRIPTION OF THE DRAWINGS

The disclosure will now be described with reference to the drawings wherein.

DESCRIPTION OF EXEMPLARY EMBODIMENTS

Figure 1:
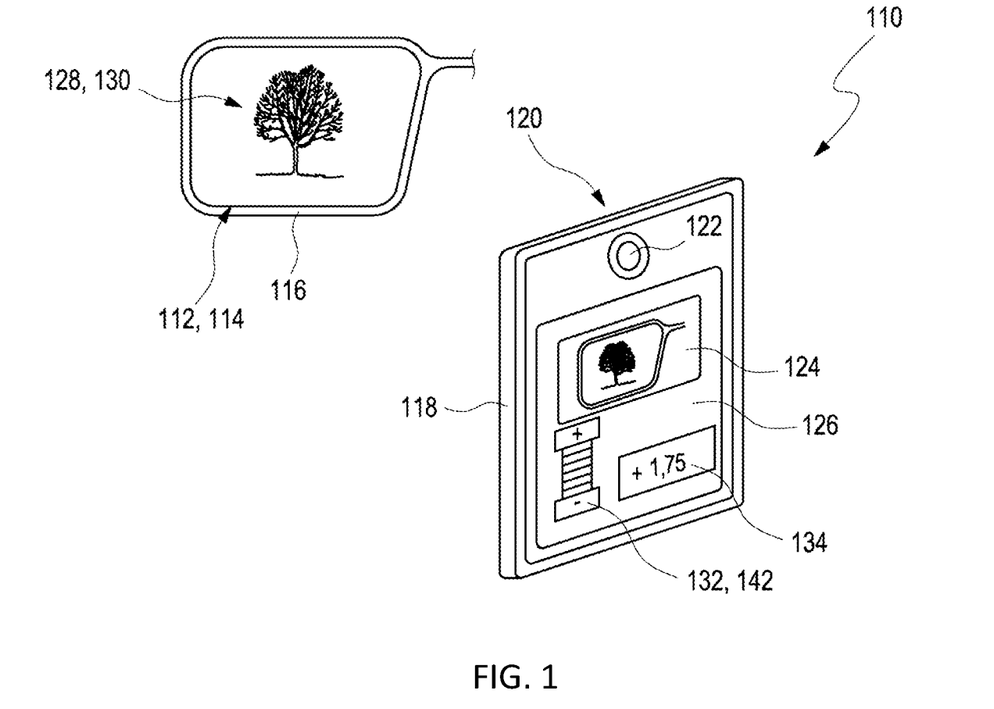
FIG. 1 illustrates a typical exemplary embodiment of a system for determining at least one optical parameter of at least one optical lens according to the present disclosure.

FIG. 1 illustrates a typical exemplary embodiment of a system 110 for determining at least one optical parameter of an optical lens 112. As schematically shown, the optical lens 112 of FIG. 1 comprises a spectacle lens 114 which is carried by a frame 116, which functions here as a holding unit being configured to hold at the at least one spectacle lens 114, in particular to increase accuracy and precision of the determination of the at least one optical parameter of the spectacle lens 114. It is, however, emphasized that, although the spectacle lens 114 is exemplarily used in the following description, the scope of the present disclosure is not limited to determining the at least one optical parameter of the spectacle lens 114; rather the same principles as described in connection with FIG. 1 are similarly applicable to any kind of optical lens 112.

As further schematically illustrated, the exemplary system 110 of FIG. 1 comprises—again without limiting the scope of the disclosure—a smartphone 118 as a typical example of an electronic device having a camera 120. It is, however, emphasized that the scope of the present disclosure is not limited to determining the at least one optical parameter of any kind of optical lens 112 by using the camera, in particular the rear camera (not depicted here) of the smartphone 118; rather any other camera, whether it may also be comprised by the smartphone 118, such as a front camera 122, or by any other electronic device, or may be a separate digital camera, can, in principle, be used for the purposes of the present disclosure. A holding unit (not depicted here) which may be configured to hold the smartphone 118 comprising the camera 120 can, further, be used for increasing the accuracy and the precision of the determination of the at least one optical parameter of the spectacle lens 114.

As shown in FIG. 1, the rear camera of the smartphone 118 is used here to capture at least one image 124 that pictures the spectacle lens 114. As an alternative, the front camera of the smartphone 118 may also be used for this task. Further, a particular example of the image 124 which pictures the spectacle lens 114 is schematically displayed here on a portion of a screen 126 as comprised by the smartphone 118. However, the image 124 that pictures the spectacle lens 114 can be displayed on any other displaying unit, such as an external monitor which may have a further screen. As an alternative, displaying the image which pictures the spectacle lens 114 can also be dispensable for the purposes of the present disclosure.

As further illustrated in FIG. 1, the at least one image 124 may be recorded by the camera 120 of the smartphone 118 in a fashion that the spectacle lens 114 is arranged between the camera 120 and a pattern 128 which serves as an object 130. As schematically shown in FIG. 1, the pattern 128 as the object 130 comprises an image of a tree. As an alternative, which may, especially, be used for a further optical lens 112 apart from the spectacle lens 114, the pattern 128 may comprises one or more of an oriented line, a circle, a letter, a number.

As further shown in FIG. 1, the exemplary system 110 of FIG. 1 comprises an evaluation unit 132 which is configured to determine the at least one optical parameter of the spectacle lens 114 by processing the at least one image 124. Again without limiting the scope of the disclosure, the evaluation unit 132 is comprised by the smartphone 118 as the typical example of an electronic device. As an alternative or in addition, a separate evaluation unit (not depicted here) can also be used for this purpose. In order to capture the at least one image 124, a focus of the camera 120 may, typically, be adjusted.

Figure 2:
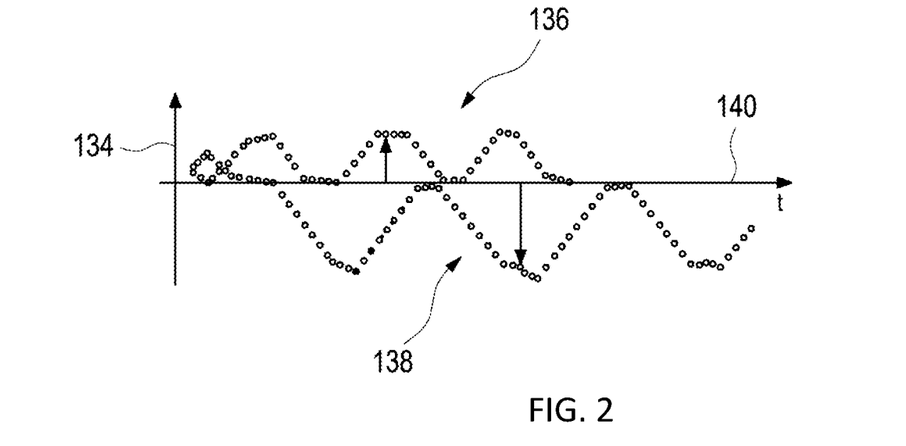
FIG. 2 illustrates a relative alteration of a signal related to a focus position as provided by a rear camera of a smartphone.

For a purpose of adjusting the focus of the camera 120, the camera 120, typically, generates at least one signal each having at least one digital value 134 which is assigned, in a direct or an indirect fashion, to the position of the focus of the camera 120. By way of example, the camera 120 may provide the at least one digital value 134 for the at least one signal by using a function that can be denoted by a term such as "Lens Position." According to the position of the focus of the camera 120, the at least one digital value 134 may vary for subsequent frames as a function of time t as depicted in FIG. 2. As schematically illustrated there, the at least one digital value 134 varies depending on whether the spectacle lens 114 may be a positive lens 136 or a negative lens 138 with respect to a baseline 140.

For capturing the at least one image 124 the position of the focus of the camera 120 may be adjusted in a manual fashion by a user of the camera 120. For this purpose, the smartphone 118 may comprise at least one dial 142, typically, in in a digital fashion, which can be used for supporting the user to set the position of the focus of the camera. Alternatively or in addition, the dial 142 may be comprised by the camera 120. As a further alternative, the position of the focus of the camera 120 may be adjusted in an automatic manner by using at least one of an autofocus system or an autofocus function as comprised by the camera 120. Accordingly, the at least one of the autofocus system or the autofocus function can modify the position of the focus, whereby the camera 120 may generate the at least one signal. In a particular exemplary embodiment, the camera 120 may perform scanning with regard to determining the position of the focus focal length of the at least one optical lens. Independently of a manner in which the position of the focus of the camera 120 may be adjusted, the at least one signal which is related to the position of the focus and which is generated by the at least one camera 120 is, in accordance with the present disclosure, used for determining the at least one optical parameter of the spectacle lens 114 by evaluating the at least one image 124 as captured by the camera 120.

Since the position of the focus and the at least one corresponding signal varies depending on the at least one optical parameter of the spectacle lens 114 of which the at least one image 124 has captured by using the camera 120, the evaluating of the at least one signal which has been generated by the camera 120 when capturing the at least one image 124 of the pattern 128 in front of which the spectacle lens 114 has been placed can be used for determining the at least one optical parameter of the spectacle lens 114. Herein, it may, especially, be typical to determine the at least one optical parameter of the spectacle lens 114 by comparing at least one first signal as generated by the camera 120 to at least one further signal as further generated by the camera 120.

Firstly, the at least one first image as captured by the camera 120 may picture a scene which may comprise the object 130 as the pattern 128 in front of which the spectacle lens 114 under investigation is placed. Herein, the focus of the camera 120 can, typically, be adjusted in a fashion that the pattern 128 is located in the focus of the camera 120. As a result, the camera 120 may generate the at least one first signal which is related to the position of the focus when capturing the at least one first image.

Further, at least one further image may be captured by the camera 120, wherein the at least one further image may picture the same scene comprising the object 130 as the pattern 128, however, without the spectacle lens 114 under investigation placed in front thereof. Herein, the focus of the camera 120 may, again, be adjusted in a fashion that the pattern 128 is located in the focus of the camera 120. As a result, the camera 120 may generate at least one further signal which is now related to the position of the focus when capturing the at least one further image. As an alternative or in addition, an already existing comparison image for which the at least one further signal and/or the position of the focus is already known can also be used as the at least one further image.

Unless the spectacle lens 114 is a non-divergent optical lens having a lens power of 0 dpt, the at least one further signal generated by the camera 120 when capturing the at least one further image differs from the at least one first signal generated by the camera 120 when capturing the at least one first image. As a result, a relationship between the at least one first signal and the at least one further signal can be derived for being used in determining the at least one optical parameter of the at least one optical lens. As already indicated above, the relationship may be or comprise a difference or a ratio between the at least one first signal and the at least one further signal; however, further kinds of relationship may also be conceivable. As schematically depicted in FIG. 1, the relationship between the at least one first signal and the at least one further signal can be presented to the user by a value indicated in field 144 on the screen 126 of the smartphone 118. Alternatively or in addition, the relationship between the at least one first signal and the at least one further signal can be used as an input for at least one further algorithm that may run on the camera 120, the evaluation unit 132, or a separate device.

It may, especially, be typical to determine the at least one optical parameter of the spectacle lens 114 by using at least one calibration function, wherein the at least one first signal, and/or the at least one further signal and/or the at least one relationship between at least one first signal and the at least one further signal may serve as an input for the at least one calibration function. As schematically illustrated in FIGS. 3 and 4, at least one known camera 120 may be used for capturing a plurality of first images using a plurality of spectacle lenses 114 each having at least one known optical parameter, typically in a consecutive manner.

Figure 3:
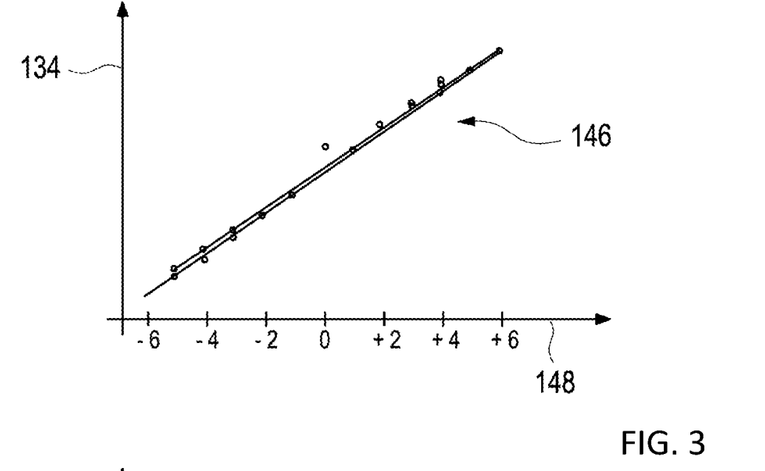
FIG. 3 illustrates a first calibration function for the signal related to the focus position for a particular smartphone with respect to various positive and negative optical lenses.

Herein, FIG. 3 exhibits a diagram illustrating a first family of first calibration functions 146 for a particular camera, i.e. an iPhone 10, for different distances between the focus and the camera 120. Herein, the diagram of FIG. 3 shows an alteration of the at least one digital value 134 associated with the first signal with increasing lens power 148 of the spectacle lens 114 from −6 dpt to +6 dpt. As a result, by using the at least one digital value associated with the first signal for a particular distance between the focus and the camera 120 the lens power 148 of the spectacle lens 114 can be determined.

Figure 4:
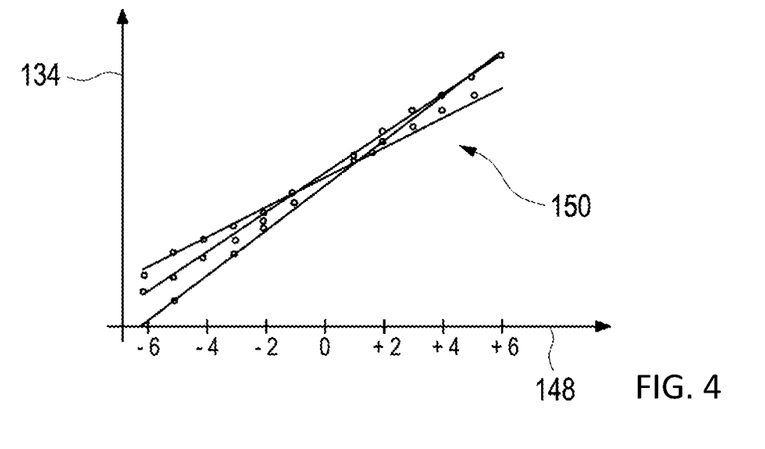
FIG. 4 illustrates a further calibration function for the signal related to the focus position for various smartphones with respect to various focal length baselines.

In a similar manner, FIG. 4 exhibits a diagram illustrating a second family of second calibration functions 150 for different cameras, i.e. an iPhone 8, an iPhone 10, and an iPhone 11. Herein, the diagram of FIG. 4, again, shows the alteration of the at least one digital value 134 associated with the first signal with increasing lens power 148 of the spectacle lens 114 from −6 dpt to +6 dpt for the different cameras. As a result, by using the at least one digital value 134 associated with the first signal for the particularly selected camera the lens power of the spectacle lens 114 can also be determined.

At least two individual images which are captured by using the camera 120, wherein each individual image pictures the spectacle lens 114 under at least two different measurement parameters can be used for determining an absolute value of the at least one optical parameter of the spectacle lens 114. Herein, the at least two different measurement parameters can differ with respect to each other by at least one of a position or an orientation of the spectacle lens 114 and/or of the camera 120.

However, as an alternative, by using at least one additional piece of information as acquired from the at least one pattern 128, a single image picturing the spectacle lens 114 can be sufficient to determine the absolute value of the at least one optical parameter of the spectacle lens. For this purpose, spatial information comprised by the at least one image 124 as captured by camera 120, such as referring to at least one known point in the at least one image may be used for this purpose. Alternatively or in addition, picture information which may differ between at least two color channels of the camera 120, can be captured by using the at least two color channels. Further, information about a temporal variation may be synchronized between a screen displaying the pattern 128 and the camera 120, wherein a synchronization signal may be exchanged between the screen and the camera 120. Further, the pattern 128 may be determined by analyzing the at last one image 124 captured by the camera 120 by using a particular image processing.

Herein, at least one additional piece of information may be acquired from the pattern 128. By using a known geometric dimension of the pattern 128 an observed geometric dimension of the pattern 128 can be related to the at least one optical parameter of the spectacle lens 114. Alternatively or in addition, by using a known geometric distortion in the at least one image 124 when applying the particular camera 120 an observed geometric distortion in the at least one image 124 can be related to the at least one optical parameter of the spectacle lens 114. Further, an alteration of at least one marking as comprised by the at least one spectacle lens 114 in the at least one image 124 can be related to the at least one optical parameter of the spectacle lens 124. However, further approaches for acquiring at least one additional piece of information may also be conceivable.

Further, at least one further algorithm for determining at least one object in the at least one image 124 picturing the spectacle lens 114 can be used. A detection of the frame carrying the spectacle lens or of the at least one marking as comprised by the spectacle lens 114 can be performed. Especially in a progressive lens, an alteration of the at least one optical parameter over an extension of the spectacle lens 114 may also be determined, specifically with respect to an optical axis of the camera 120, by using a tracking algorithm. Herein, the at least one optical parameter of the spectacle lens 114 can repeatedly be determined by acquiring the at least one signal as generated by the camera 120 which is related to the position of the focus as a function of a position within the spectacle lens 114. Further, a repeated determination of the at least one optical parameter of the spectacle lens can also be used for increasing an accuracy and/or a precision of the determination.

Figure 5:
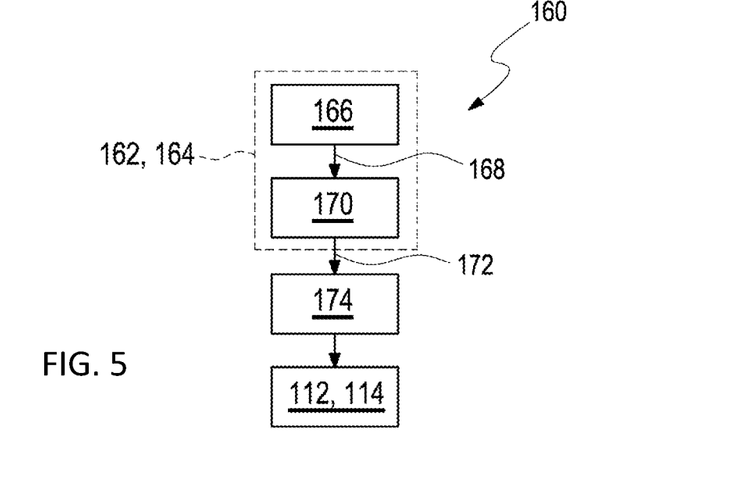
FIG. 5 illustrates a typical exemplary embodiment of a method for determining at least one optical parameter of at least one optical lens according to the present disclosure.

FIG. 5 schematically illustrates a typical exemplary embodiment of a method 160 for producing the optical lens 112, especially the spectacle lens 114.

In a specifying step 162, the at least one optical parameter of the optical lens 112, especially of the spectacle lens 114, is determined in accordance with the method 164 for determining the at least one optical parameter of the optical lens 112, especially of the spectacle lens 114.

Herein, the specifying step 162 comprises according to step a), a capturing step 166, during which the at least one image 124 that pictures the optical lens 112, especially the spectacle lens 114, is captured by using a camera 120. Herein, the camera 120 generates at least one signal 168 which is related to a position of the focus as described above in more detail.

Further, the specifying step 162 comprises according to step b) a determining step 170, during which at least one optical parameter 172 of the optical lens 112, especially of the spectacle lens 114, is determined by processing the at least one image 124. In particular accordance with the present disclosure, the at least one optical parameter 172 of the optical lens 112, especially of the spectacle lens 114, is determined by using the at least one signal related to the position of the focus as provide in the capturing step 166.

For further details concerning the specifying step 162, reference can be made to the description above.

In a processing step 174, the optical lens 112, especially the spectacle lens 114, is produced as well-known by the person skilled in the art by processing a lens blank or a semi-finished optical lens (not depicted here), e.g. by milling or drilling the lens blank or the semi-finished optical lens, in a manner that at least one optical parameter 170 of the optical lens 112, especially the spectacle lens 114, which is produced from the lens blank or the semi-finished optical lens, is adjusted during the processing step 174 in a desired fashion. As a result, the optical lens 112, especially the spectacle lens 114, which is produced in this manner exhibits the at least one desired optical parameter 172.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS 110 system for determining at least one optical parameter of at least one optical lens
112 optical lens
114 spectacle lens
116 frame 118 smartphone
120 camera
122 front camera
124 image
126 screen
128 pattern
130 object
132 evaluation unit
134 digital value
136 positive lens
138 negative lens
140 baseline
142 dial
144 field
146 first calibration function
148 lens power
150 second calibration function
160 method for producing at least one optical lens
162 specifying step
164 method for determining at least one optical parameter of at least one optical lens
166 capturing step
168 signal
170 determining step
172 optical parameter
174 processing step

The invention claimed is:

1. A method for determining at least one optical parameter of at least one spectacle lens, the method comprising the following steps:
   a) capturing at least one image picturing the at least one spectacle lens by using at least one camera, wherein the at least one camera generates at least one signal related to a position of a focus of the at least one camera; and
   b) determining at least one optical parameter of the at least one spectacle lens by processing the at least one image and by using the at least one signal related to the position of the focus of the at least one camera,
   wherein the at least one optical parameter of the at least one spectacle lens is determined by comparing the at least one signal related to the position of the focus of the at least one camera to at least one further signal related to a further position of the focus of the at least one camera in at least one further image not picturing the at least one spectacle lens.

2. The method according to claim 1, wherein the position of the focus is adjusted by at least one of the camera or a user.

3. The method according to claim 1, wherein the at least one signal related to the position of the focus serves as an input for at least one calibration function, which is used in determining the at least one optical parameter of the at least one spectacle lens.

4. The method according to claim 1, wherein the at least one further image is captured by further using the at least one camera, or wherein the at least one further image is a comparison image.

5. The method according to claim 1, wherein the at least one focus of the at least one camera is adjusted to at least one object in space in at least one first distance to the at least one spectacle lens and in at least one second distance to the at least one camera, wherein the at least one optical parameter of at least one spectacle lens is determined by processing the at least one image further capturing the at least one object in space in the at least one first distance to the at least one spectacle lens and in the at least one second distance to the at least one camera.

6. The method according to claim 5, wherein the at least one object is or comprises at least one eye of the user.

7. The method according to claim 5, wherein the at least one optical parameter of the at least one spectacle lens is determined by using from the at least one image capturing the at least one object at least one of:
   spatial information included in the at least one image that is captured by the at least one camera;
   picture information that is captured by at least two color channels of the at least one camera; and
   information about at least one temporal variation, which is synchronized between a screen displaying the at least one object and the at least one camera, or wherein the at least one object displayed during step a) is determined by analyzing the at last one captured image.

8. The method according to claim 5, wherein the at least one optical parameter of the at least one spectacle lens is determined by using at least one of:
   at least one known geometric dimension of the at least one object;
   at least one known geometric distortion in the at least one image by using the at least one camera; and
   at least one marking of the at least one spectacle lens.

9. A computer program product comprising instructions which, when the program is executed by a computer, cause the computer to carry out a method for determining at least one optical parameter of at least one spectacle lens, the method comprising the following steps:
   a) capturing at least one image picturing at least one spectacle lens by using at least one camera, wherein the at least one camera generates at least one signal related to a position of a focus of the at least one camera; and
   b) determining at least one optical parameter of the at least one spectacle lens by processing the at least one image and by using the at least one signal related to the position of the focus of the at least one camera,
   wherein the at least one optical parameter of the at least one spectacle lens is determined by comparing the at least one signal related to the position of the focus of the at least one camera to at least one further signal related to a further position of the focus of the at least one camera in at least one further image not picturing the at least one spectacle lens.

10. A method for producing at least one optical lens, wherein the producing of the at least one optical lens comprises processing at least one lens blank by adjusting at least one optical parameter of the at least one spectacle lens, wherein the at least one optical parameter of the at least one spectacle lens is determined by a method for determining at least one optical parameter of at least one spectacle lens, the method for determining the at least one optical parameter comprising the following steps:
   a) capturing at least one image picturing at least one spectacle lens by using at least one camera, wherein the at least one camera generates at least one signal related to a position of a focus of the at least one camera; and
   b) determining at least one optical parameter of the at least one spectacle lens by processing the at least one image and by using the at least one signal related to the position of the focus of the at least one camera,
   wherein the at least one optical parameter of the at least one spectacle lens is determined by comparing the at least one signal related to the position of the focus of the at least one camera to at least one further signal related to a further position of the focus of the at least one camera in at least one further image not picturing the at least one spectacle lens.

11. A system for determining at least one optical parameter of at least one spectacle lens, the system comprising:
- at least one camera, wherein the at least one camera is configured to capture at least one image picturing the at least one spectacle lens and to generate at least one signal related to a position of a focus of the at least one camera;
- at least one evaluation unit, wherein the at least one evaluation unit is configured to determine at least one optical parameter of the at least one spectacle lens by processing the at least one image and by using the at least one signal related to the position of the focus of the at least one camera,
- wherein the at least one evaluation unit is further configured to determine the at least one optical parameter of the at least one spectacle lens by comparing the at least one signal related to the position of the focus of the at least one camera to at least one further signal related to a further position of the focus of the at least one camera in at least one further image not picturing the at least one spectacle lens.

12. The system according to claim 11, wherein the at least one camera is configured to adjust the position of the focus by using at least one of an autofocus system or an autofocus function as comprised by the at least one camera, or an input generated by the user.

13. The system according to claim 11, further comprising at least one of:
- a screen configured to display at least one object;
- a distance meter configured to determine at least one distance;
- an imaging unit configured to detect at least one marking comprised by the at least one spectacle lens;
- a holding unit configured to hold at least one of the at least one camera or the at least one spectacle lens.

14. The system according to claim 11, wherein at least one of the at least one camera or the at least one evaluation unit is comprised by a mobile communication device, wherein the at least one camera configured to capture the at least one image is at least one of a rear camera or a front camera as comprised by the mobile communication device.

15. A method for determining at least one optical parameter of at least one spectacle lens, the method comprising the following steps:
a) capturing at least one image picturing the at least one spectacle lens by using at least one camera, wherein the at least one camera generates at least one signal related to a position of a focus of the at least one camera, wherein at least one focus of the at least one camera is adjusted to at least one object in space in at least one first distance to the at least one optical lens and in at least one second distance to the at least one camera; and
b) determining at least one optical parameter of the at least one spectacle lens by processing the at least one image and by using the at least one signal related to the position of the focus of the at least one camera, wherein the at least one optical parameter of at least one optical lens is determined by processing the at least one image by further capturing the at least one object in space in the at least one first distance to the at least one optical lens and in the at least one second distance to the at least one camera,
wherein the at least one optical parameter of the at least one spectacle lens is determined by using at least one known geometric distortion in the at least one image by using the at least one camera, wherein at least one observed geometric distortion in the at least one image is related to the at least one optical parameter of the at least one spectacle lens by applying a known relationship.

16. A computer program product comprising instructions which, when the program is executed by a computer, cause the computer to carry out the method for determining at least one optical parameter of at least one spectacle lens, the method comprising the following steps:
a) capturing at least one image picturing at least one spectacle lens by using at least one camera, wherein the at least one camera generates at least one signal related to a position of a focus of the at least one camera, wherein at least one focus of the at least one camera is adjusted to at least one object in space in at least one first distance to the at least one optical lens and in at least one second distance to the at least one camera; and
b) determining at least one optical parameter of the at least one spectacle lens by processing the at least one image and by using the at least one signal related to the position of the focus of the at least one camera, wherein the at least one optical parameter of at least one optical lens is determined by processing the at least one image by further capturing the at least one object in space in the at least one first distance to the at least one optical lens and in the at least one second distance to the at least one camera,
wherein the at least one optical parameter of the at least one spectacle lens is determined by using at least one known geometric distortion in the at least one image by using the at least one camera, wherein at least one observed geometric distortion in the at least one image is related to the at least one optical parameter of the at least one spectacle lens by applying a known relationship.

17. A method for producing at least one optical lens, wherein the producing of the at least one optical lens includes processing at least one lens blank by adjusting at least one optical parameter of the at least one spectacle lens, wherein the at least one optical parameter of the at least one spectacle lens is determined by a method for determining at least one optical parameter of at least one spectacle lens, the method for determining the at least one optical parameter comprising the following steps:
a) capturing at least one image picturing at least one spectacle lens by using at least one camera, wherein the at least one camera generates at least one signal related to a position of a focus of the at least one camera, wherein at least one focus of the camera is adjusted to at least one object in space in at least one first distance to the at least one optical lens and in at least one second distance to the at least one camera; and
b) determining at least one optical parameter of the at least one spectacle lens by processing the at least one image and by using the at least one signal related to the position of the focus of the at least one camera, wherein the at least one optical parameter of at least one optical lens is determined by processing the at least one image by further capturing the at least one object in space in the at least one first distance to the at least one optical lens and in the at least one second distance to the at least one camera,
wherein the at least one optical parameter of the at least one spectacle lens is determined by using at least one known geometric distortion in the at least one image by using the at least one camera, wherein at least one observed geometric distortion in the at least one image is related to the at least one optical parameter of the at least one spectacle lens by applying a known relationship.

18. A system for determining at least one optical parameter of at least one spectacle lens, the system comprising:
at least one camera, wherein the at least one camera is configured to capture at least one image picturing the at least one spectacle lens and to generate at least one signal related to a position of a focus of the at least one camera, and wherein at least one focus of the at least one camera is adjusted to at least one object in space in at least one first distance to the at least one optical lens and in at least one second distance to the at least one camera;
at least one evaluation unit, wherein the at least one evaluation unit is configured to determine at least one optical parameter of the at least one spectacle lens by processing the at least one image and by using the at least one signal related to the position of the focus of the at least one camera, wherein the at least one optical parameter of at least one optical lens is determined by processing the at least one image by further capturing the at least one object in space in the at least one first distance to the at least one optical lens and in the at least one second distance to the at least one camera,
wherein the at least one evaluation unit is further configured to determine the at least one optical parameter of the at least one spectacle lens by using at least one known geometric distortion in the at least one image by using the at least one camera, wherein at least one observed geometric distortion in the at least one image is related to the at least one optical parameter of the at least one spectacle lens by applying a known relationship.

19. A method for determining at least one optical parameter of at least one spectacle lens, the method comprising the following steps:
a) capturing at least one image picturing the at least one spectacle lens by using at least one camera, wherein the at least one camera generates at least one signal related to a position of a focus of the at least one camera, wherein at least one focus of the at least one camera is adjusted to at least one object in space in at least one first distance to the at least one optical lens and in at least one second distance to the at least one camera; and
b) determining at least one optical parameter of the at least one spectacle lens by processing the at least one image and by using the at least one signal related to the position of the focus of the at least one camera, wherein the at least one optical parameter of at least one optical lens is determined by processing the at least one image by further capturing the at least one object in space in the at least one first distance to the at least one optical lens and in the at least one second distance to the at least one camera,
wherein the at least one optical parameter of the at least one spectacle lens is determined by using at least one marking comprised by the at least one spectacle lens, wherein at least one alteration of the at least one marking in the at least one image is related to the at least one optical parameter of the at least one spectacle lens by applying a known relationship.

20. A computer program product comprising instructions which, when the program is executed by a computer, cause the computer to carry out the method for determining at least one optical parameter of at least one spectacle lens, the method comprising the following steps:
a) capturing at least one image picturing at least one spectacle lens by using at least one camera, wherein the at least one camera generates at least one signal related to a position of a focus of the at least one camera, wherein at least one focus of the at least one camera is adjusted to at least one object in space in at least one first distance to the at least one optical lens and in at least one second distance to the at least one camera; and
b) determining at least one optical parameter of the at least one spectacle lens by processing the at least one image and by using the at least one signal related to the position of the focus of the at least one camera, wherein the at least one optical parameter of at least one optical lens is determined by processing the at least one image by further capturing the at least one object in space in the at least one first distance to the at least one optical lens and in the at least one second distance to the at least one camera,
wherein the at least one optical parameter of the at least one spectacle lens is determined by using at least one marking comprised by the at least one spectacle lens, wherein at least one alteration of the at least one marking in the at least one image is related to the at least one optical parameter of the at least one spectacle lens by applying a known relationship.

21. A method for producing at least one optical lens, wherein the producing of the at least one optical lens includes processing at least one lens blank by adjusting at least one optical parameter of the at least one spectacle lens, wherein the at least one optical parameter of the at least one spectacle lens is determined by a method for determining at least one optical parameter of at least one spectacle lens, the method for determining the at least one optical parameter comprising the following steps:
a) capturing at least one image picturing at least one spectacle lens by using at least one camera, wherein the at least one camera generates at least one signal related to a position of a focus of the at least one camera, wherein at least one focus of the at least one camera is adjusted to at least one object in space in at least one first distance to the at least one optical lens and in at least one second distance to the at least one camera; and
b) determining at least one optical parameter of the at least one spectacle lens by processing the at least one image and by using the at least one signal related to the position of the focus of the at least one camera, wherein the at least one optical parameter of at least one optical lens is determined by processing the at least one image by further capturing the at least one object in space in the at least one first distance to the at least one optical lens and in the at least one second distance to the at least one camera,
wherein the at least one optical parameter of the at least one spectacle lens is determined by using at least one marking comprised by the at least one spectacle lens, wherein at least one alteration of the at least one marking in the at least one image is related to the at least one optical parameter of the at least one spectacle lens by applying a known relationship.

22. A system for determining at least one optical parameter of at least one spectacle lens, the system comprising:
at least one camera, wherein the at least one camera is configured to capture at least one image picturing the at least one spectacle lens and to generate at least one signal related to a position of a focus of the at least one camera, and wherein at least one focus of the at least one camera is adjusted to at least one object in space in at least one first distance to the at least one optical lens and in at least one second distance to the at least one camera;

at least one evaluation unit, wherein the at least one evaluation unit is configured to determine at least one optical parameter of the at least one spectacle lens by processing the at least one image and by using the at least one signal related to the position of the focus of the at least one camera, wherein the at least one optical parameter of at least one optical lens is determined by processing the at least one image by further capturing the at least one object in space in the at least one first distance to the at least one optical lens and in the at least one second distance to the at least one camera, wherein the at least one evaluation unit is further configured to determine the at least one optical parameter of the at least one spectacle lens by using at least one marking comprised by the at least one spectacle lens, wherein at least one alteration of the at least one marking in the at least one image is related to the at least one optical parameter of the at least one spectacle lens by applying a known relationship.

\* \* \* \* \*